(12) United States Patent
Cheon et al.

(10) Patent No.: US 8,265,553 B2
(45) Date of Patent: Sep. 11, 2012

(54) EXTERNAL DEVICE FOR MOBILE COMMUNICATION TERMINAL AND NFC METHOD USING THE SAME

(75) Inventors: Sung-Rock Cheon, Seoul (KR); Jae-Sic Jeon, Seoul (KR); O-Hyon Kwon, Seoul (KR); Joo-Sik Lee, Seoul (KR)

(73) Assignee: SK Planet Co., Ltd., Seoul (KR)

(*) Notice: Subject to any disclaimer, the term of this patent is extended or adjusted under 35 U.S.C. 154(b) by 1633 days.

(21) Appl. No.: 11/643,957

(22) Filed: Dec. 22, 2006

(65) Prior Publication Data

US 2007/0155430 A1  Jul. 5, 2007

(30) Foreign Application Priority Data

Dec. 30, 2005  (KR) .................. 10-2005-0135829

(51) Int. Cl.
H04B 5/00 (2006.01)

(52) U.S. Cl. ... 455/41.1; 455/41.2; 455/558; 361/679.4; 361/679.41; 710/300; 710/303

(58) Field of Classification Search ............... 445/558, 445/41.1, 41.2; 361/679.4, 679.41; 710/300, 710/303
See application file for complete search history.

(56) References Cited

U.S. PATENT DOCUMENTS

| | | | |
|---|---|---|---|
| 6,151,653 A * | 11/2000 | Lin et al. | 710/305 |
| 6,181,953 B1 * | 1/2001 | Shirota et al. | 455/557 |
| 7,213,766 B2 * | 5/2007 | Ryan et al. | 235/492 |
| 2003/0183691 A1 * | 10/2003 | Lahteenmaki et al. | 235/441 |
| 2004/0143693 A1 * | 7/2004 | Hwang | 710/305 |
| 2005/0085278 A1 * | 4/2005 | Lin | 455/573 |
| 2005/0274803 A1 | 12/2005 | Lee | |
| 2006/0198364 A1 * | 9/2006 | Fujii | 370/352 |
| 2006/0208066 A1 * | 9/2006 | Finn et al. | 235/380 |
| 2007/0038854 A1 * | 2/2007 | Cheon et al. | 713/156 |
| 2007/0055633 A1 * | 3/2007 | Cheon et al. | 705/65 |
| 2007/0066307 A1 * | 3/2007 | Brown et al. | 455/445 |
| 2007/0075133 A1 * | 4/2007 | Yeager | 235/380 |
| 2007/0141997 A1 * | 6/2007 | Wulff et al. | 455/78 |
| 2007/0155443 A1 * | 7/2007 | Cheon et al. | 455/572 |
| 2009/0043935 A1 * | 2/2009 | Huomo et al. | 710/301 |
| 2009/0115571 A1 * | 5/2009 | Bishop et al. | 340/5.61 |
| 2010/0007467 A1 * | 1/2010 | Breitfuss et al. | 340/10.1 |

FOREIGN PATENT DOCUMENTS

KR   1020050056779   6/2005

OTHER PUBLICATIONS

Philips, "S2C Interface for NFC", Jan. 21, 2005.*
Yoshida, "Chip makers still uncertain of plunge into NFC", Nov. 15, 2004, EE Times.*
Schimanke et al. "Cellular system solutions for NFC-enabled handsets", Feb. 1, 2005, http://www.eetasia.com/ARTICLES/2005FEB/B/2005FEB01_RFD_DSP_PD_TA.pdf.*

* cited by examiner

Primary Examiner — Rafael Pérez-Gutiérrez
Assistant Examiner — Allahyar Kasraian
(74) Attorney, Agent, or Firm — Lowe Hauptman Ham & Berner, LLP

(57) ABSTRACT

Disclosed herein are an external device for a mobile communication terminal, which enables non-contact NFC with the outside through a Near Field Communication (NFC) unit, and an NFC method using the external device. The external device for a mobile communication terminal includes a serial communication unit, an NFC unit, a smart card unit and an antenna. The serial communication unit is connected to a mobile communication terminal body through a connector. The NFC unit communicates with the mobile communication terminal body through the serial communication unit and communicates with the outside via non-contact NFC. The smart card unit communicates with the NFC unit. The antenna is configured such that the NFC unit transmits/receives signals via non-contact NFC through the antenna.

12 Claims, 11 Drawing Sheets

(PRIOR ART)

EXTERNAL DEVICE FOR MOBILE COMMUNICATION TERMINAL AND NFC METHOD USING THE SAME

BACKGROUND OF THE INVENTION

1. Field of the Invention

The present invention relates, in general, to Near Field Communication (NFC) and, more particularly, to an external device for a mobile communication terminal, which enables non-contact NFC with the outside through an NFC unit, and an NFC method using the external device.

2. Related Art

The term "NFC" refers to a non-contact NFC technique that can transmit data at low power over a short distance through the application of a Radio Frequency Identification (RFID) technique using a frequency band of 13.56 MHz. NFC has been standardized chiefly by European Computer Manufacturers Association (ECMA) International. Nokia, Sony and Philips have participated in the standardization and commercialization of NFC.

When NFC is used, not only basic information, such as telephone numbers, but also data, such as Moving Picture Experts Group-½ Audio Layer 3 (MP3) files and photos, can be exchanged by bringing two or more terminals close to each other without any manipulation by a user.

Meanwhile, for use as a credit card or traffic card, there has been introduced a mobile communication terminal in which a module, to which a smart card can be attached, is included in the back of a mobile communication terminal body and an antenna is contained in a battery pack.

Figure 1:
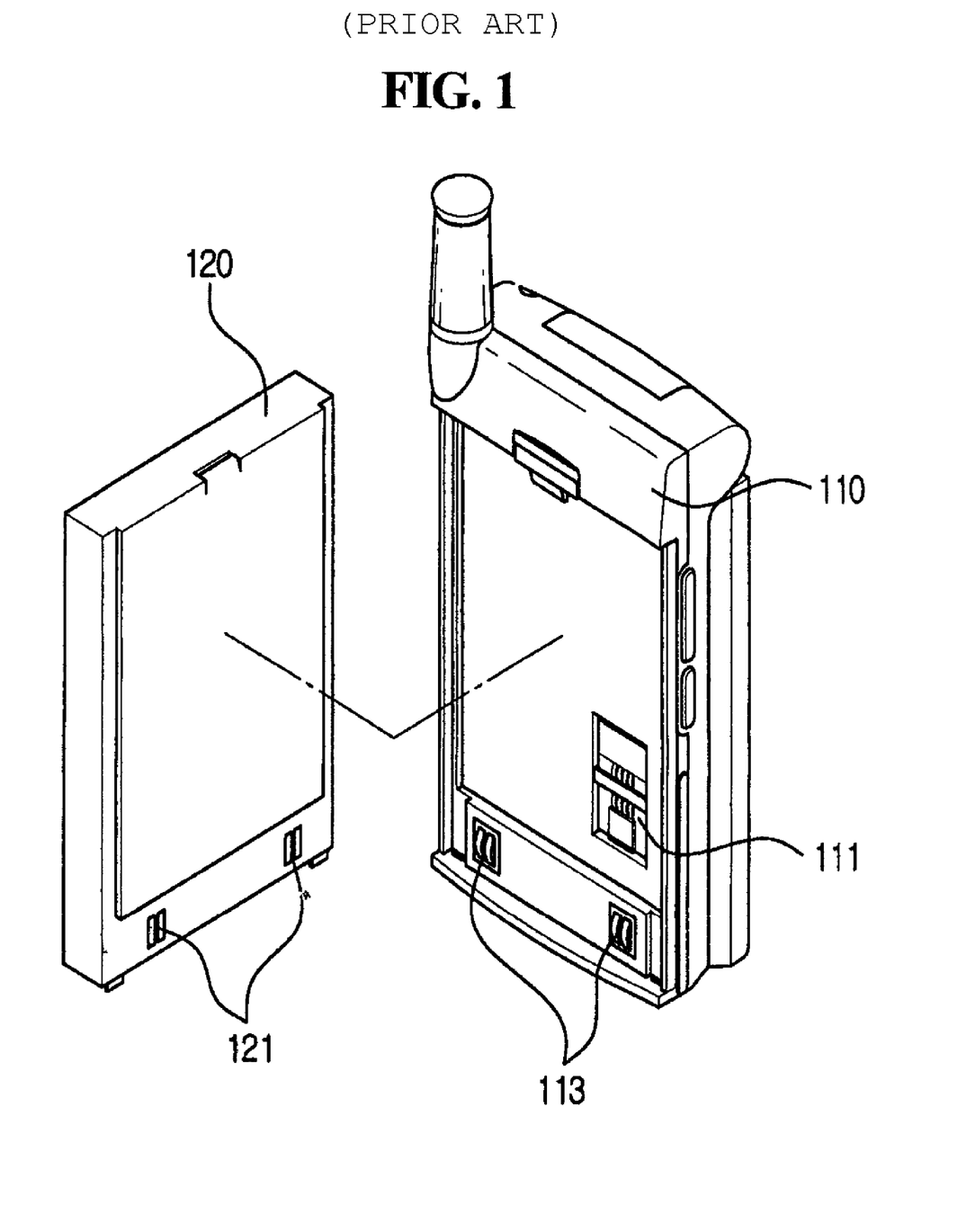
FIG. 1 is an exploded perspective view of a conventional mobile communication terminal.

FIG. 1 is an exploded perspective view of a conventional mobile communication terminal.

Referring to FIG. 1, the conventional mobile communication terminal includes a mobile communication terminal body 110 and a battery pack 120.

The conventional mobile communication terminal body 110 is configured such that a smart card chip is attached to the back of the mobile communication terminal body 110. For example, a socket 111 corresponding to the chip specification of the smart card compliant with the ISO 7816 standard is formed in the back of the mobile communication terminal body 110.

When a smart card chip supporting a credit card or traffic card function is mounted in the socket 111 in the back of the mobile communication terminal body 110 and the battery pack 120 containing an antenna is attached to the mobile communication terminal body 110, the smart card chip and a baseband chip included in the mobile communication terminal body 110 communicate via the International Standards Organization (ISO) 7816 protocol, etc, analog signals from the smart card chip are transmitted to the antenna through connection terminals 113 and 121 between the mobile communication terminal body 110 and the battery pack 120, and analog signals received by the antenna are transmitted to the smart card chip through the connection terminals 113 and 121.

In general, antenna signals are high-frequency analog signals. The characteristic of the signal transfer between the smart card and the antenna is a very important factor that affects the characteristics of the antenna. Accordingly, when analog signals are transmitted/received between the smart card chip and the antenna through the connection terminals 113 and 121 between the mobile communication terminal body 110 and the battery pack 120, the signal transfer characteristic of the connection terminals 113 and 121 between the mobile communication terminal body 110 and the battery pack 120 must be appropriately maintained.

However, the connection terminals 121 of the battery pack 120 or the connection terminals 113 of the mobile communication terminal body 110 are covered with dust or worn away due to the frequent attachment and detachment of the battery pack 120, therefore the signal transfer characteristic of the connection terminals 113 and 121 may be significantly changed.

When the signal transfer characteristic of the connection terminals 113 and 121 between the mobile communication terminal body 110 and the battery pack 120 is significantly changed, signals received from the outside and signals transmitted to the outside through the antenna are distorted. Consequently, a serious problem in which the transactions of the traffic card or credit card through the smart card chip are erroneously performed may occur.

Furthermore, Korean Unexamined Patent Publication No. 2005-56779 discloses a portable storage device to be connected to a 24-pin socket included in a mobile communication terminal body. The disclosed portable storage device is only an external device that is simply connected to a mobile communication terminal and used as a portable storage device. However, the portable storage device never performs any NFC or Universal Serial Bus (USB) communication function.

Accordingly, there is an urgent need for a new external device for a mobile communication terminal, which does not change the characteristic of signals transmitted/received through the antenna despite the attachment and detachment of the battery pack to and from the mobile communication terminal, can be easily attached to a mobile communication terminal body, and enables USB communication with a USB host, and an NFC method using the external device.

SUMMARY OF THE INVENTION

Accordingly, the present invention has been made keeping in mind the above problems occurring in the prior art, and an object of the present invention is to provide an external device for a mobile communication terminal, which is easily attached to a mobile communication terminal body, can communicate with the mobile communication terminal body, and enables non-contact NFC using a built-in antenna, and an NFC method using the external device.

Another object of the present invention is to provide an external device for a mobile communication terminal, which serves as a USB slave and can communicate with a USB host device, and an NFC method using the external device.

Still another object of the present invention is to provide an external device for a mobile communication terminal, which, when two or more mobile communication terminals are brought close to each other and without manipulation by a user, allows the mobile communication terminals to exchange not only basic information, such as telephone numbers, but also MP3 files, photo data, information for electronic commerce, such as an authorized certificate, and an NFC method using the external device.

Yet another object of the present invention is to provide an external device for a mobile communication terminal, which allows smart card modules based on not only the S2C protocol of NFC but also the ISO protocol of general contact/non-contact smart cards to be inserted into a socket in a plug-in fashion and to be compatible with NFC, and an NFC method using the external device.

A further object of the present invention is to provide an external device for a mobile communication terminal, which does not change the characteristic of analog signals transmitted/received through an antenna despite the frequent attachment and detachment of the battery pack of the mobile communication terminal, and an NFC method using the external device.

In order to accomplish the above objects, the present invention provides an external device for a mobile communication terminal including a serial communication unit connected to a mobile communication terminal body through a 24-pin connector, an NFC unit for communicating with the mobile communication terminal body through the serial communication unit and communicating with an outside via non-contact NFC, a smart card unit for communicating with the NFC unit, and an antenna configured such that the NFC unit transmits/receives signals via non-contact NFC through the antenna.

The NFC unit includes all circuit devices that perform NFC in accordance with the NFC standards.

The smart card module includes all types of IC cards for storing personal information, user IDs, the amount of charged money for the use of a service, Digital Rights Management (DRM) information, and information about an authorized certificate.

The NFC unit may communicate with the mobile communication terminal by transmitting/receiving a digital signal based on a digital communication protocol.

The external device may further include a protocol matching unit for performing protocol conversion between the NFC unit and the smart card unit.

An antenna matching circuit and so on may be arranged between the NFC unit and the antenna.

Furthermore, according to another embodiment of the present invention, there is provided a USB adapter for an external device for a mobile communication terminal, including a 24-pin socket configured such that the 24-pin connector of the external device for the mobile communication terminal, which communicates with the outside via non-contact NFC, is connected through the 24-pin socket, a USB connector connected to a USB host device and configured to transmit/receive USB signals, and a signal relay unit for relaying signals between the external device and the USB host device between the 24-pin socket and the USB connector.

Furthermore, according to still another embodiment of the present invention, there is provided an NFC method, including the step of an external device for a mobile communication terminal detecting the connection of a mobile communication terminal body through a 24-pin connector, the step of an NFC unit within the external device communicating with the mobile communication terminal body via the serial communication protocol, the step of the NFC unit communicating with the outside by transmitting/receiving signals through an antenna within the external device via non-contact NFC, and the step of a smart card unit communicating with the NFC unit.

The method may further include the step of the external device detecting the connection of a USB host device, and the step of the external device serving as a USB slave and communicating with the USB host device.

The step of the NFC unit communicating with the mobile communication terminal body may include the step of the external device and the mobile communication terminal body performing serial communication via the RS-232 protocol.

The method may further include the step of performing protocol conversion between the NFC unit and the smart card unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail in connection with preferred embodiments with reference to the accompanying drawings below.

Figure 2:
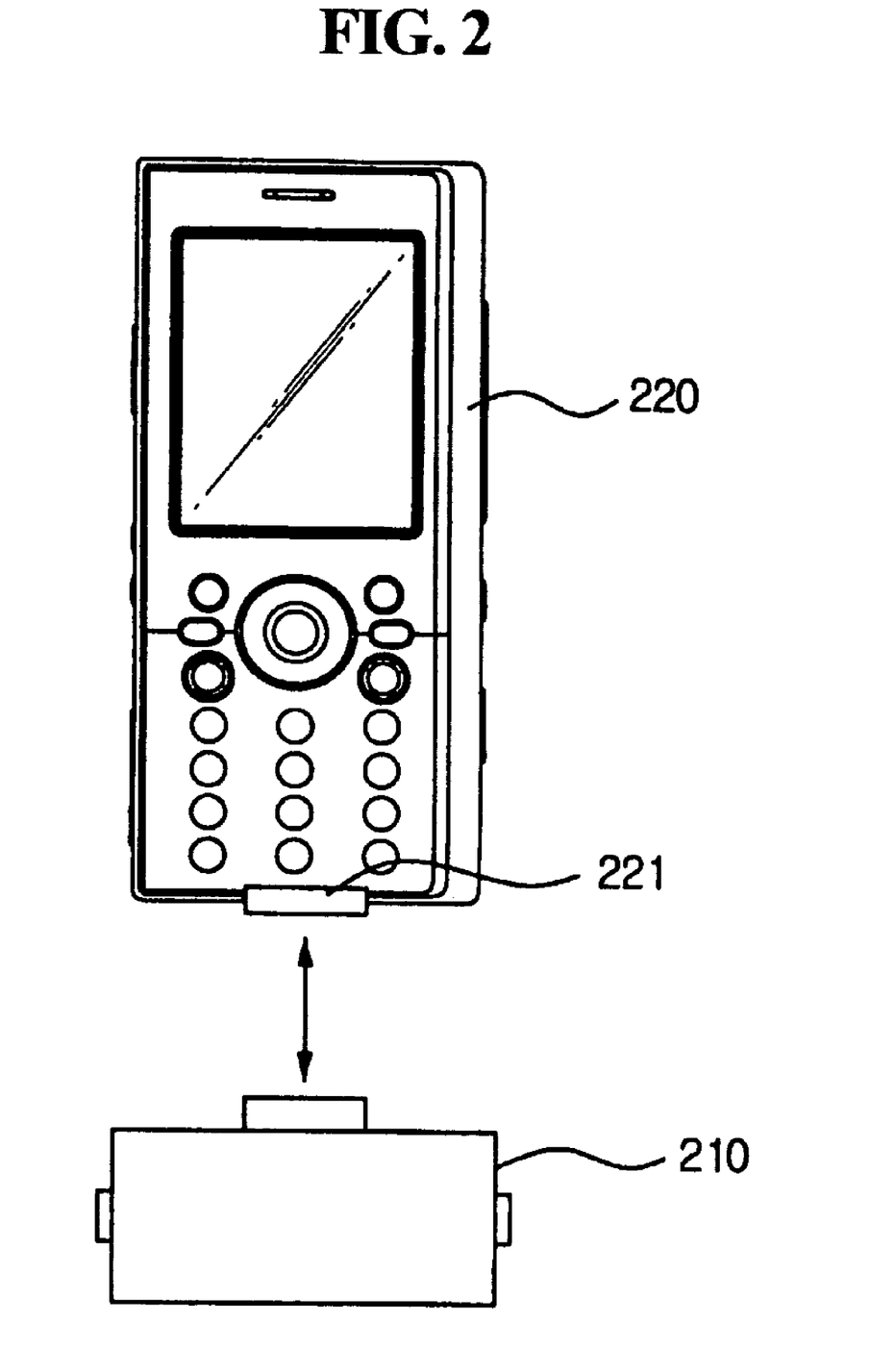
FIG. 2 is a diagram of an external device for a mobile communication terminal according to the present invention.

FIG. 2 is a diagram of an external device for a mobile communication terminal according to the present invention.

Referring to FIG. 2, the external device 210 for a mobile communication terminal according to an embodiment of the present invention is mounted onto the socket 221 of the mobile communication terminal and is connected to a mobile communication terminal body 220. It is preferred that the socket 221 have 24 pins. A 24-pin socket will be described as an example below.

The external device 210 for the mobile communication terminal includes an NFC unit, an antenna and a smart card unit, thereby enabling non-contact NFC.

For example, a user who attempts to pass through a security gate can transmit authentication information to a reader through the antenna within the external device by bringing a mobile communication terminal equipped with the external device 210 close to the reader that is installed at the security gate for entry authentication. That is, when information requesting authentication is received from the reader through the antenna within the external device 210, information based on the received signal can be transmitted to the smart card module of the smart card unit through the NFC unit within the external device 210. In this case, a protocol matching unit may perform protocol conversion between the NFC unit and the smart card unit.

The smart card module extracts authentication information, such as a user Identification (ID) for user identification, stored in Electrically Erasable Programmable Read Only Memory (EEPROM) under the control of a Central Processing Unit (CPU). The extracted authentication information can be transmitted to the NFC unit and can then be transmitted to the external reader through the antenna. If corresponding authentication is successful in the reader, the user can pass through the security gate. Furthermore, the smart card module can output user information for user identification, authorized certificate information, copyright information, information about the amount of charged money for the use of a service or the like in response to an input signal.

Furthermore, in the case where a reader is used for payment of transportation or shopping, a user brings a mobile communication terminal equipped with the external device of the present invention close to the reader as described above and can then make payment for transportation or shopping if authentication for the amount of charged money is successful in the reader.

For example, mobile communication terminals equipped with the external devices of the present invention or other NFC devices can perform NFC. Currently, most users store and use electronic name cards, photos, motion images, and/or telephone directories in their mobile communication terminals. However, only when such personal information is newly input or downloaded whenever terminals are changed, can users use the same personal information, which was stored in previous terminals, in current terminals.

However, in the mobile communication terminal equipped with the external device of the present invention, when the personal information is managed in the smart card module within the external device, it is possible to move the personal information to a peer terminal through communication between the mobile communication terminals. For example, mobile communication terminals equipped with the external devices of the present invention are brought close to each other, and one of the mobile communication terminals attempting to transmit personal information can send the personal information, along with authentication information, to the other mobile communication terminal through the antenna. When the authentication information and the personal information are received through the antenna within the external device, the other mobile communication terminal can transmit information based on the received signals to the smart card module through the NFC unit. In this case, the smart card module can perform authentication under the control of the CPU, and store and manage the personal information included in the received signals in the EEPROM if the authentication is successful.

Figure 3:
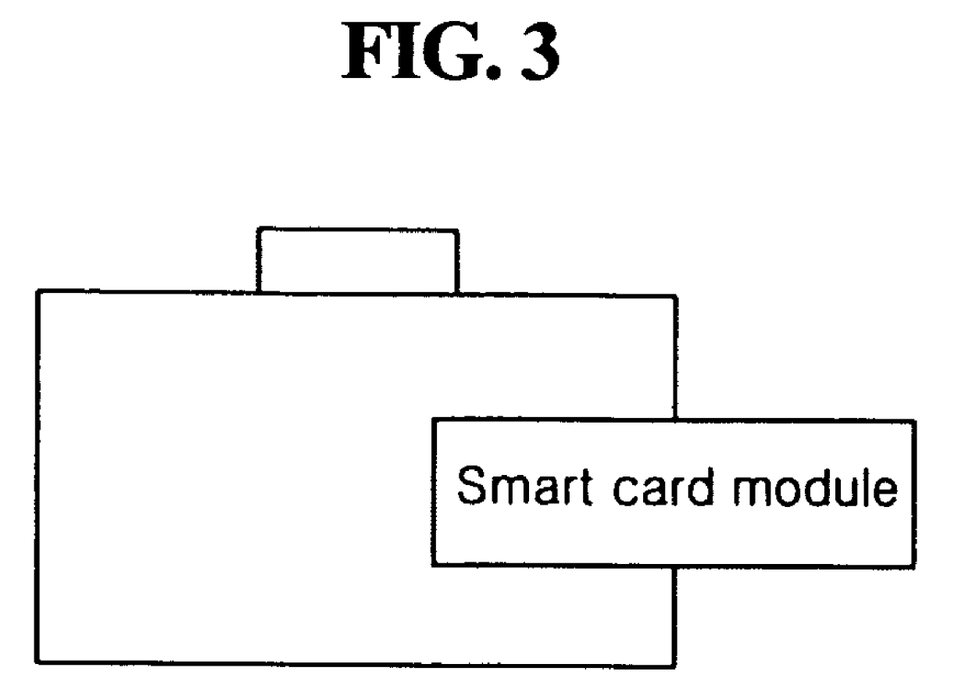
FIG. 3 is a diagram of an example of the external device for the mobile communication terminal shown in FIG. 2.

FIG. 3 is a diagram of an example of the external device for the mobile communication terminal shown in FIG. 2.

Referring to FIG. 3, the external device for the mobile communication terminal includes a socket into which a smart card module can be inserted. The socket may be a plug-in socket. Therefore, a user can perform NFC by inserting a smart card module to be used into the socket of the external device.

Figure 4:
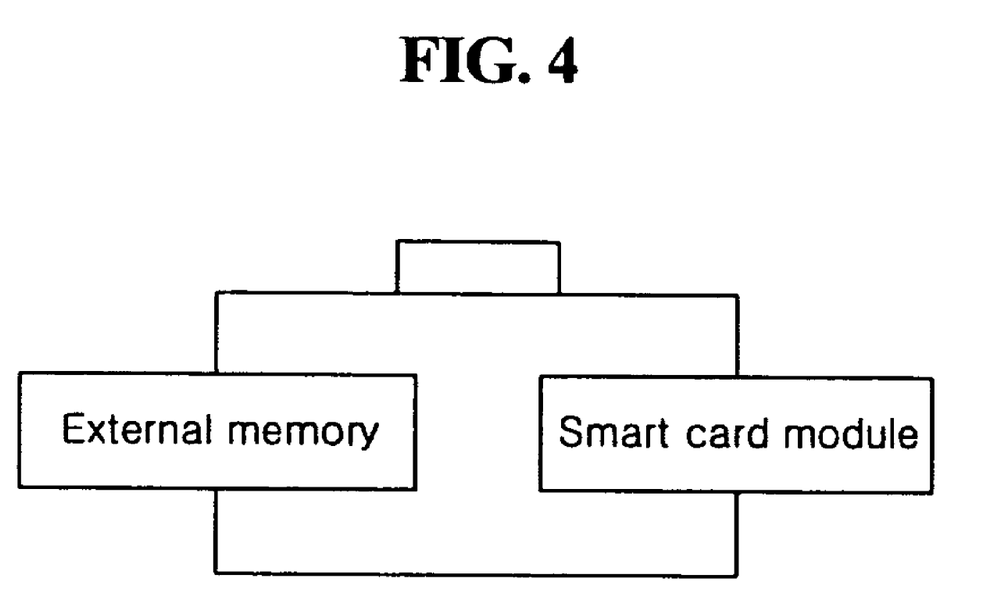
FIG. 4 is a diagram of another example of the external device for the mobile communication terminal shown in FIG. 2.

FIG. 4 is a diagram of another example of the external device for the mobile communication terminal shown in FIG. 2.

Referring to FIG. 4, the external device for the mobile communication terminal includes a socket into which a smart card module can be inserted and a socket into which external memory can be inserted. The socket may be a plug-in socket. Therefore, a user can insert a smart card module and external memory to be used into the sockets of the external device. The external memory may be non-volatile memory, such as NAND flash memory.

Figure 5:
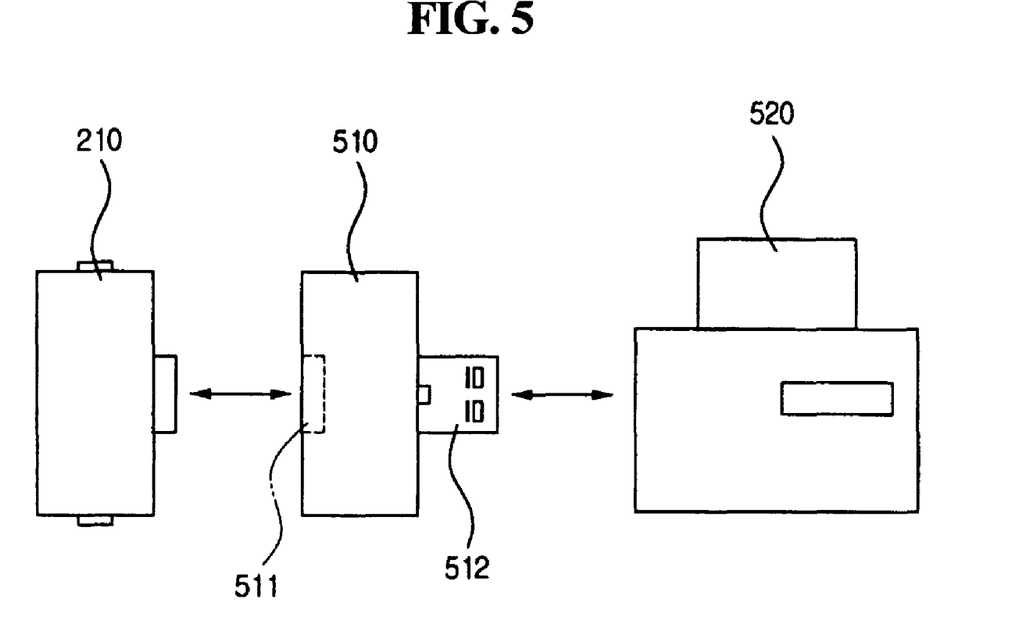
FIG. 5 is a diagram illustrating the USB communication of the external device for the mobile communication terminal using a USB adapter.

FIG. 5 is a diagram illustrating the USB communication of the external device for the mobile communication terminal using a USB adapter.

Referring to FIG. 5, the external device 210 for the mobile communication terminal 210 is connected to a USB host device 520 via a USB adapter 510.

The external device 210 for the mobile communication terminal operates as a USB slave.

The USB adapter 510 includes a 24-pin socket 511 to which the 24-pin connector of the external device 210 is connected and a USB connector 512 which is connected to the USB host device 520, thereby relaying signals between the external device 210 and the USB host device 520.

The USB host device 520 includes all devices having USB host controllers, such as a Personal Computer (PC).

For example, in the case where the external device 210 for the mobile communication terminal provides a traffic card function, the external device 210 can charge a traffic card with money through USB communication with the USB host device 520 such as a PC.

For example, the external device 210 for the mobile communication terminal can receive and store data stored in a memory within the USB host device 520 through USB communication. Conversely, data stored in the external device 210 for the mobile communication terminal can be stored in the USB host device 520 through USB communication.

Figure 6:
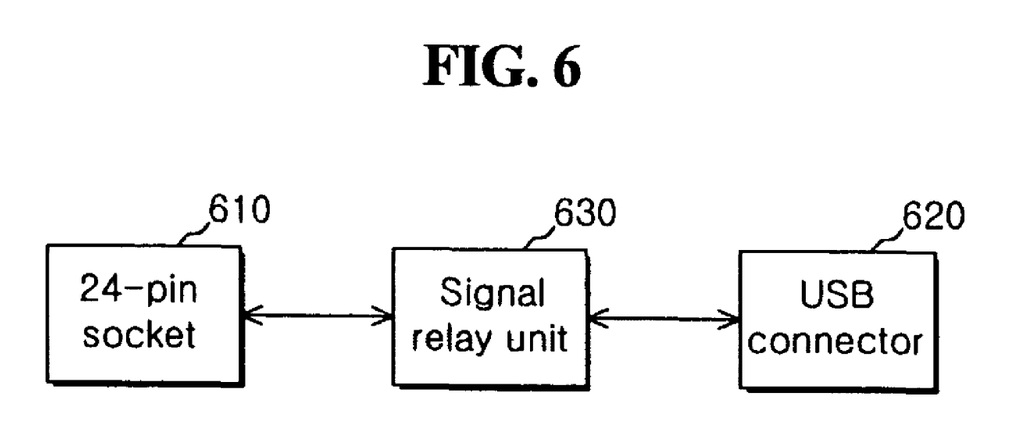
FIG. 6 is a block diagram of an example of the USB adapter shown in FIG. 5.

FIG. 6 is a block diagram of an example of the USB adapter shown in FIG. 5.

Referring to FIG. 6, the USB adapter includes a 24-pin socket 610, a USB connector 620, and a signal relay unit 630.

To the 24-pin socket 610 is connected the 24-pin connector of the external device for the mobile communication terminal.

The USB connector 620 is connected to the USB host device and transmits/receives USB signals.

The signal relay unit 630 relays signals between the external device and the USB host device between the 24-pin socket 610 and the USB connector 620.

The pins of the 24-pin socket 610 have respective uses set according to Korean Telecommunications Technology Association (TTA) standards. Therefore, in the signal relay unit 630, the terminals of the USB connector 620 can be appropriately wired to the terminals of the 24-pin socket 610, so signals can be relayed between the external device and the USB host device.

Figure 7:
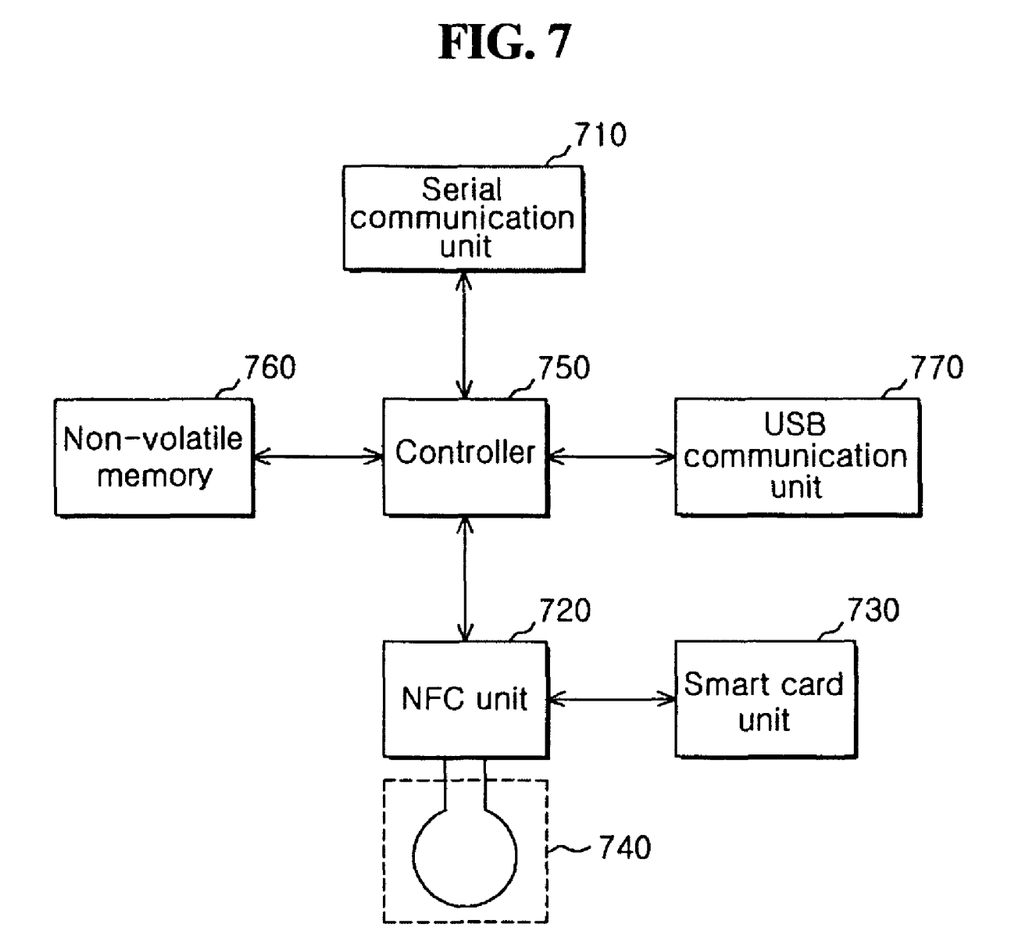
FIG. 7 is a block diagram of an external device for a mobile communication terminal according to an embodiment of the present invention.

FIG. 7 is a block diagram of an external device for a mobile communication terminal according to an embodiment of the present invention.

Referring to FIG. 7, the external device for a mobile communication terminal according to the embodiment of the present invention includes a serial communication unit 710, an NFC unit 720, a smart card unit 730, an antenna 740, a controller 750, non-volatile memory 760, and a USB communication unit 770.

A mobile communication terminal equipped with the external device shown in FIG. 7 can perform the function of a smart card for a traffic card or a credit card through communication with a reader. The mobile communication terminal equipped with the external device shown in FIG. 7 can also exchange data, such as personal information, telephone number information and/or copyright information, with peers equipped with different NFC devices, that is, mobile communication terminals equipped with devices having constructions corresponding to that of the external device shown in FIG. 7.

The serial communication unit 710 is connected to a mobile communication terminal body through a 24-pin connector. That is, the serial communication unit 710 includes the 24-pin connector mounted in a 24-pin socket of the mobile communication terminal. The 24-pin connector may be connected to the USB host device through the USB adapter shown in FIG. 5.

In this case, the serial communication unit 710 may perform serial communication with the mobile communication terminal body via the RS-232 protocol. The serial communication unit 710 can perform data communication using pins Nos. 3, 13, 14, 17, 18, 20, 23, and 24 other than the power supply pin of a 24-pin Input/Output (I/O) terminal based on the TTA standards.

The NFC unit 720 communicates with the baseband chip of the mobile communication terminal body through the serial communication unit 710 and communicates with the outside via non-contact NFC.

The NFC unit 720 may generate a Radio Frequency (RF) signal corresponding to a signal received from the baseband chip of the mobile communication terminal body or the smart card unit 730, and transmit the generated RF signal to a reader or a peer terminal through the antenna 740. Furthermore, the NFC unit 720 may generate a signal corresponding to an RF signal received through the antenna 740, and transmit the generated signal to the baseband chip of the mobile communication terminal body or the smart card unit 730.

The smart card unit 730 communicates with the NFC unit 720. The communication between the smart card unit 730 and the NFC unit 720 may be performed via the S2C protocol.

The smart card unit 730 may include smart card modules including all types of IC cards for storing personal information, a user ID, the amount of charged money for the use of a service, DRM information, authorized certificate information, and so on.

The controller 750 controls the serial communication unit 710 and the USB communication unit 770, and relays signals between the serial communication unit 710, the USB communication unit 770, the non-volatile memory 760, and the NFC unit 720. For example, the controller 750 may be implemented using a microprocessor or the like.

In particular, the controller 750 may cause an external device and a mobile communication terminal body to perform serial communication with each other if it is determined that the mobile communication terminal body has been connected to the external device through the 24-pin connector, and cause an external device to communicate with a USB host through the USB communication unit 770 if it is determined that the USB host has been connected to the external device.

The non-volatile memory 760 may be NAND flash memory or the like, and can store data received through the serial communication unit 710, the USB communication unit 770 or the NFC unit 720. That is, the non-volatile memory 760 is used as the portable storage space of the mobile communication terminal.

The USB communication unit 770 can convert a signal in accordance with the USB protocol such that the external device shown in FIG. 7 can serve as a USB slave and communicate with the USB host.

The USB communication unit 770 can also transmit/receive signals through the 24-pin connector and, accordingly, may transmit/receive USB data using pin No. 15 of the 24-pin connector.

Therefore, in the external device shown in FIG. 7, the smart card unit 730, the NFC unit 720 or the non-volatile memory 760 can exchange data with a USB host device, such as a PC.

Figure 8:
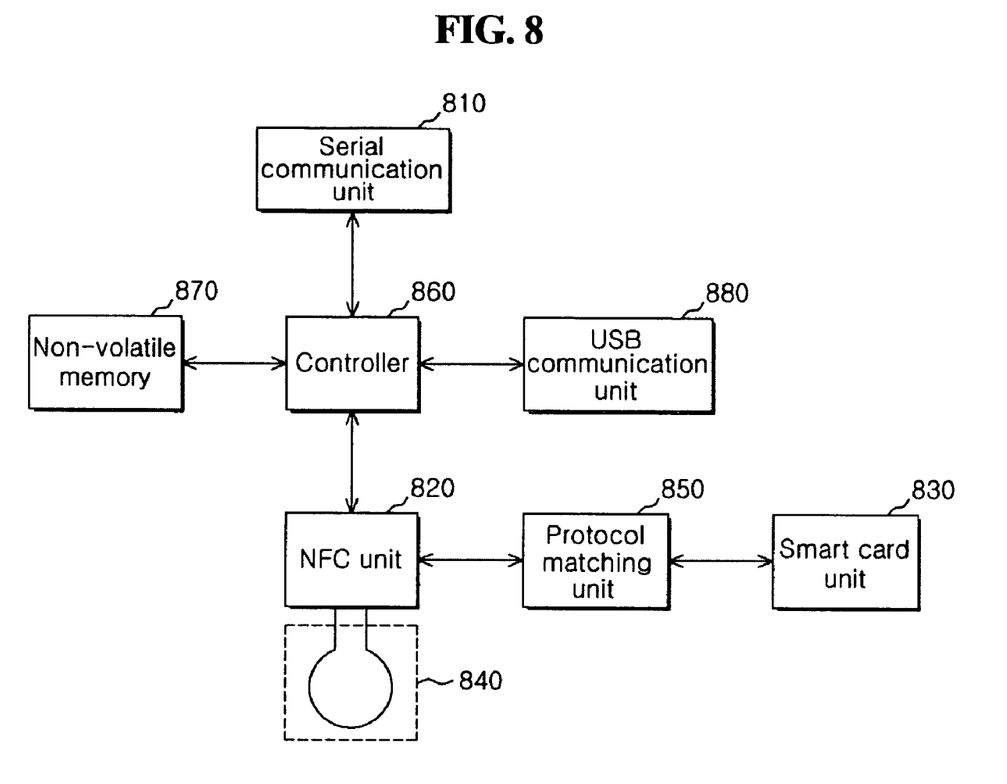
FIG. 8 is a block diagram of an external device for a mobile communication terminal according to another embodiment of the present invention.

FIG. 8 is a block diagram of an external device for a mobile communication terminal according to another embodiment of the present invention.

Referring to FIG. 8, the external device for a mobile communication terminal according to the embodiment of the present invention includes a serial communication unit 810, an NFC unit 820, a smart card unit 830, an antenna 840, a protocol matching unit 850, a controller 860, non-volatile memory 870, and a USB communication unit 880.

The external device shown in FIG. 8 can also perform the function of a smart card for a traffic card, a credit card, or the like through communication with a reader in the same manner as the external device shown in FIG. 7. The external device can also exchange data, such as personal information, telephone number information and/or copyright information, with peers equipped with different NFC devices.

The serial communication unit 810 is connected to a mobile communication terminal body through a 24-pin connector. That is, the serial communication unit 810 includes the 24-pin connector mounted in the 24-pin socket of the mobile communication terminal. The 24-pin connector may be connected to a USB host device through the USB adapter shown in FIG. 5.

In this case, the serial communication unit 810 may perform serial communication with the mobile communication terminal body via the RS-232 protocol. The serial communication unit 810 can perform data communication using pin Nos. 3, 13, 14, 17, 18, 20, 23, and 24 other than the power supply pin of a 24-pin I/O terminal based on the TTA standards.

The NFC unit 820 communicates with the baseband chip of the mobile communication terminal body through the serial communication unit 810 and communicates with the outside via non-contact NFC.

The NFC unit 820 may generate an RF signal corresponding to a signal received from the baseband chip of the mobile communication terminal body or the smart card unit 830, and transmit the generated RF signal to a reader or a peer terminal through the antenna 840. Furthermore, the NFC unit 820 may generate a signal corresponding to an RF signal received through the antenna 840, and transmit the generated signal to the baseband chip of the mobile communication terminal body or the smart card unit 830.

The protocol matching unit 850 performs protocol conversion between the NFC unit 820 and the smart card unit 830. For example, in the case where the NFC unit 820 performs communication via the S2C protocol and the smart card unit 830 performs communication via the ISO 7816 or ISO 14443 protocol, the protocol matching unit 850 converts an S2C protocol based signal into an ISO 7816 or 14443 protocol based signal and converts an ISO 7816 or 14443 protocol based signal into an S2C protocol based signal.

In this case, the protocol matching unit 850 may perform protocol conversion depending on the type of smart card module used in the smart card unit 830. In this case, the protocol matching unit 850 can transmit a chip identification signal indicating the type of smart card module from the smart card unit 830 to the protocol matching unit 850. The protocol matching unit 850 can determine the type of the smart card module using the received chip identification signal and perform protocol conversion.

The smart card unit 830 communicates with the NFC unit 820 through the protocol matching unit 850. The communication between the smart card unit 830 and the NFC unit 820 can be performed via the S2C protocol.

The smart card unit 830 may include smart card modules including all types of IC cards for storing personal information, a user ID, the amount of charged money for use of a service, DRM information, authorized certificate information, and so on.

In this case, the smart card unit 830 may include a plug-in socket into which a smart card module is inserted. In other words, various types of smart card modules supporting a variety of protocols can be inserted into the plug-in socket The controller 860 controls the serial communication unit 810, the USB communication unit 880, and so on, and relays signals between the serial communication unit 810, the USB communication unit 880, the non-volatile memory 870, and the NFC unit 820. For example, the controller 860 may be implemented using a microprocessor or the like.

In particular, the controller 860 may cause the external device and the mobile communication terminal body to perform serial communication with each other if it is determined that the mobile communication terminal body has been connected to the external device through the 24-pin connector, and cause an external device to communicate with the USB host through the USB communication unit 880 if it is determined that the USB host has been connected to the external device.

The non-volatile memory 870 may be NAND flash memory or the like, and can store data received through the serial communication unit 810, the USB communication unit 880 or the NFC unit 820. That is, the non-volatile memory 870 is used as the portable storage space of the mobile communication terminal.

The USB communication unit 880 can convert a signal in accordance with the USB protocol such that the external device shown in FIG. 8 can serve as a USB slave and communicate with the USB host.

The USB communication unit 880 also transmits/receives signals through the 24-pin connector and, accordingly, can transmit/receive USB data using pin No. 15 of the 24-pin connector.

Therefore, in the external device shown in FIG. 8, the smart card unit 830, the NFC unit 820 or the non-volatile memory 870 can exchange data with a USB host device, such as a PC.

Figure 9:
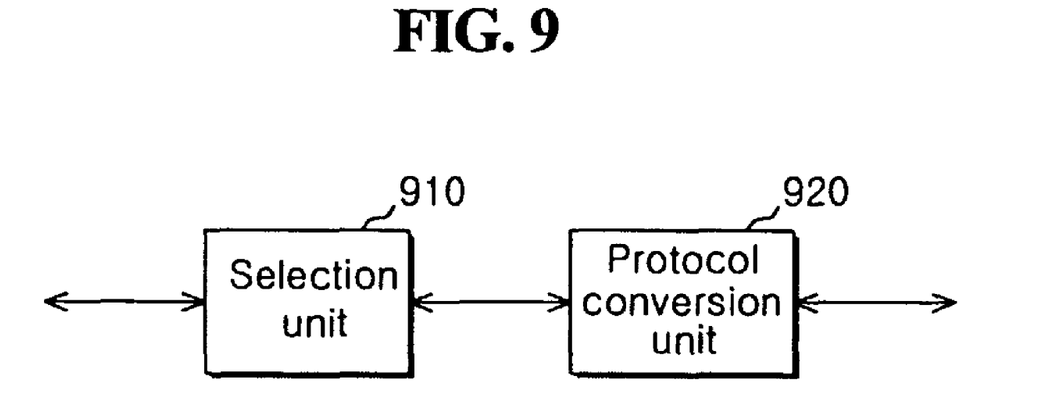
FIG. 9 is a block diagram of an example of the protocol matching unit shown in FIG. 8.

FIG. 9 is a block diagram of an example of the protocol matching unit 850 shown in FIG. 8.

Referring to FIG. 9, the protocol matching unit includes a selection unit 910 and a protocol conversion unit 920.

In the case where the smart card unit and the NFC unit transmit/receive signals via the same protocol, the selection unit 910 bypasses signals, which are input to and output from the NFC unit, to the smart card unit.

Furthermore, in the case where the smart card unit and the NFC unit transmit/receive signals according to different protocols, the selection unit 910 outputs signals, which are input to and output from the NFC unit, to the protocol conversion unit 920 as signals for protocol conversion. Accordingly, the protocol conversion unit 920 performs protocol conversion such that signals for protocol conversion are compatible with signals input to and output from the smart card unit according to the type of a smart card module mounted in the smart card unit.

Figure 10:
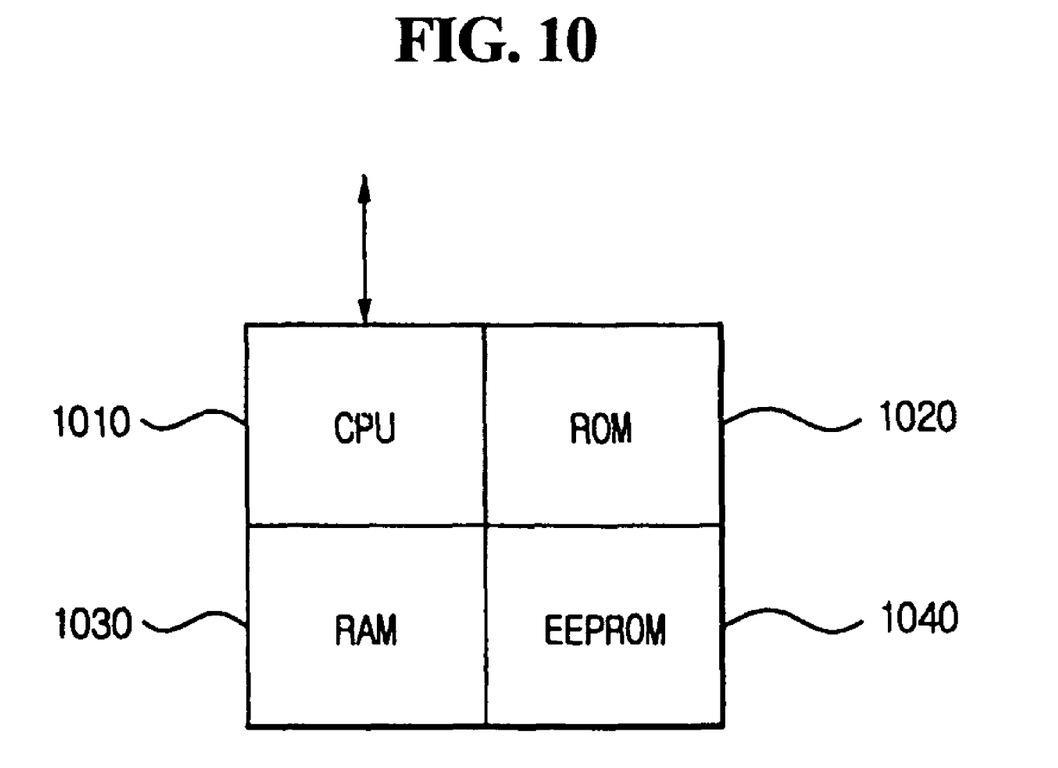
FIG. 10 is a block diagram of an example of a smart card module.

FIG. 10 is a block diagram of an example of a smart card module.

Referring to FIG. 10, the smart card module may include a CPU 1010, Read Only Memory (ROM) 1020, Random Access Memory (RAM) 1030 and Electrically Erasable Programmable ROM (EEPROM) 1040.

The CPU 1010 is responsible for the overall control of a smart card module.

The ROM 1020 stores an overall system program for the operation of a smart card module.

The RAM 1030 stores temporary data necessary for operations over internal data.

The EEPROM 1040 stores authentication information for transmission and reception in conjunction with an external card reader or other terminals.

Figure 11:
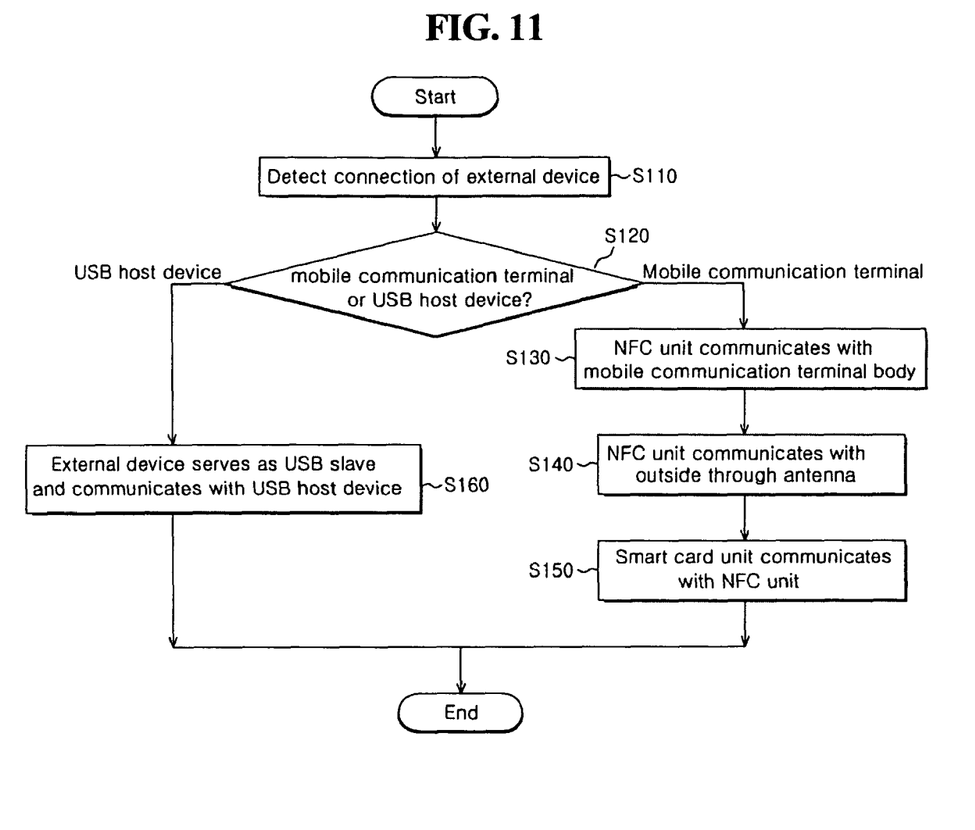
FIG. 11 is a flowchart of an NFC method according to an embodiment of the present invention.

FIG. 11 is a flowchart of an NFC method according to an embodiment of the present invention.

Referring to FIG. 11, in the NFC method according to the embodiment of the present invention, the external device for the mobile communication terminal detects the connection of the external device to the 24-pin connector at step S110.

It is then determined whether the detected external device is the mobile communication terminal or the USB host device at step S120.

If it is determined that the external device is the mobile communication terminal at step S120, the NFC unit within the external device communicates with the mobile communication terminal body via the serial communication protocol at step S130.

In this case, the NFC unit can communicate with the mobile communication terminal body by transmitting/receiving signals via the RS-232 protocol.

Thereafter, the NFC unit communicates with the outside by transmitting/receiving signals through the antenna within the external device via non-contact NFC at step S140.

In this case, since both the NFC unit and the antenna are included in the external device, there is no influence resulting from variation in the impedance of contacts due to the attachment and detachment of the battery pack to and from the mobile communication terminal.

The smart card unit then communicates with the NFC unit at step S150.

In this case, the NFC method may further include the step of performing protocol conversion between the NFC unit and the smart card unit. The step of performing protocol conversion may include performing protocol conversion between a first protocol used for communication with the NFC unit and a second protocol used for communication with the smart card unit depending on the type of a smart card module used in the smart card unit.

If it is determined that the external device is the USB host device at step S120, the external device serves as a USB slave and communicates with the USB host device at step S160.

In this case, the external device may be connected to the USB host device using the USB adapter shown in FIG. 5. Furthermore, the external device can transmit/receive USB data using pin No. 15 of the 24-pin connector.

The respective steps shown in FIG. 11 may be performed in the order shown in FIG. 11, in the reverse order thereof, or simultaneously.

As described above, in accordance with the external device for the mobile communication terminal and the NFC method using the external device according to the present invention, the external device can be conveniently attached to the mobile communication terminal body to communicate with the mobile communication terminal body. The external device can also perform non-contact NFC using a built-in antenna.

Furthermore, according to the present invention, the external device for the mobile communication terminal serves as a USB slave and can communicate with a USB host device.

Furthermore, according to the present invention, two or more mobile communication terminals can exchange not only basic information such as telephone numbers but also MP3 files, photo data, information for electronic commerce, such as an authorized certificate, etc. without manipulation by a user if they are brought close to each other.

Furthermore, according to the present invention, smart card modules based on not only the S2C protocol of NFC but also the ISO 7817 or ISO 14443 protocol, such as general contact/non-contact smart cards, can be inserted into a socket in a plug-in fashion and are compatible with NFC.

Furthermore, the present invention can prevent a change in the characteristics of analog signals transmitted/received through an antenna despite the frequent attachment and detachment of a battery pack to and from a mobile communication terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An external device for a mobile communication terminal, said external device comprising:
    a serial communication unit connectable to the mobile communication terminal through a connector;
    an antenna;
    a Near Field Communication (NFC) unit for communicating with the mobile communication terminal through the serial communication unit and communicating with an outside device via non-contact NFC through the antenna;
    a smart card unit for communicating with the NFC unit;
    a Universal Serial Bus (USB) communication unit, other than the serial communication unit; and
    a protocol matching unit coupled between the NFC unit and the smart card unit;
    wherein
    the external device is configured to detect whether the external device is connected to one of
        (i) the mobile communication terminal through the connector of the serial communication unit, and
        (ii) to a USB host device via the USB communication unit;
    the NFC unit is configured to, in response to a determination that the external device is connected to the mobile communication terminal,
        communicate with the mobile communication terminal via a serial communication protocol,
        communicate with the outside device by transmitting/receiving signals through the antenna via non-contact NFC, and
        communicate with the smart card unit, wherein the protocol matching unit is configured to perform protocol conversion between the NFC unit and the smart card unit; and
    the external device is configured to, in response to a determination that the external device is connected to the USB host device, serve as a USB slave and communicate with the USB host device via a USB interface.

2. The external device of claim 1, wherein
    the smart card unit comprises a plug-in socket into which a smart card module is inserted; and
    the protocol matching unit is coupled between the NFC unit and the smart card unit for performing protocol conversion between a first protocol used for communication with the NFC unit and a second protocol used for communication with the smart card unit depending on a type of the smart card module inserted into the plug-in socket.

3. The external device of claim 2, wherein the first protocol is SigIn-SigOut-Connection (S2C) protocol and the second protocol is either International Standards Organization (ISO) 7816 protocol or ISO 14443 protocol.

4. The external device of claim 3, wherein the protocol matching unit comprises:
    a selection unit for selectively bypassing signals based on the S2C protocol, which are input to and output from the NFC unit, to the smart card module, or outputting the signals as signals for protocol conversion; and
    a protocol conversion unit for performing protocol conversion so that the signals based on the S2C protocol for protocol conversion, which are output from the selection unit, and signals which are input to and output from the smart card unit, are compatible with each other.

5. The external device of claim 2, wherein the protocol matching unit comprises:
    a selection unit for selectively bypassing signals based on the first protocol, which are input to and output from the NFC unit, to the smart card module, or outputting the signals as signals for protocol conversion; and
    a protocol conversion unit for performing protocol conversion so that the signals based on the first protocol for protocol conversion, which are output from the selection unit, and signals which are input to and output from the smart card unit, are compatible with each other.

6. The external device of claim 2, wherein the external device is configured to obtain, from the smart card module and in response to input signals, user information for user identification, authorized certificate information, copyright information or information about an amount of charged money for use of a service.

7. The external device of claim 1, further comprising a USB adapter, the USB adapter comprising:
    a socket configured for detachable connection with the connector of the serial communication unit;
    a USB connector for detachable connection to the USB host device and configured to transmit/receive USB signals; and
    a signal relay unit for relaying signals between the external device and the USB host device via the socket and the USB connector, respectively.

8. A Near Field Communication (NFC) method, comprising:
    an external device for a mobile communication terminal detecting whether the external device is connected to one of
        (i) the mobile communication terminal through a connector of a serial communication unit of the external device and
        (ii) a Universal Serial Bus (USB) host device via a Universal Serial Bus (USB) communication unit, other than the serial communication unit, of the external device;
    if the external device is connected to the mobile communication terminal,
        an NFC unit within the external device communicating with the mobile communication terminal via a serial communication protocol;
        the NFC unit communicating with an outside by transmitting/receiving signals through an antenna within the external device via non-contact NFC;
        a smart card unit within the external device communicating with the NFC unit; and
        a protocol matching unit coupled between the NFC unit and the smart card unit within the external device performing protocol conversion between the NFC unit and the smart card unit; and
    if the external device is connected to the USB host device, the external device serving as a USB slave and communicating with the USB host device.

9. The NFC method of claim 8, wherein the protocol conversion comprises performing protocol conversion between a first protocol used for communication with the NFC unit and a second protocol used for communication with the smart card unit depending on a type of a smart card module inserted into the smart card unit.

10. The NFC method of claim 9, wherein the protocol conversion comprises selectively bypassing signals based on an S2C protocol, which are input to and output from the NFC unit, to the smart card module, or outputting the signals as signals for protocol conversion; and performing protocol conversion so that the signals based on the S2C protocol for protocol conversion and signals which are input to and output from the smart card unit, are compatible with each other.

11. The NFC method of claim 9, further comprising transmit a chip identification signal indicating the type of the smart card module inserted into the smart card unit; and determining the type of the smart card module using the received chip identification signal for performing protocol conversion.

12. The NFC method of claim 8, further comprising removably plugging the connector of a serial communication unit of the external device into a socket of an adapter which is physically separate from the external device;

removably plugging an USB connector of the adapter into the USB host device; and communicating the external device with the USB host device via the adapter.

* * * * *